United States Patent [19]

Messenger

[11] 4,120,360

[45] Oct. 17, 1978

[54] TREATING WELLS TO MITIGATE FLOW-AFTER-CEMENTING

[75] Inventor: Joseph U. Messenger, Dallas, Tex.

[73] Assignee: Mobil Oil Corporation, New York, N.Y.

[21] Appl. No.: 796,912

[22] Filed: May 16, 1977

[51] Int. Cl.$^2$ .............................................. E21B 33/14
[52] U.S. Cl. ...................................... 166/293; 106/85
[58] Field of Search .................. 166/293, 292; 106/85

[56] References Cited

U.S. PATENT DOCUMENTS

| | | | |
|---|---|---|---|
| 2,705,050 | 3/1955 | Davis et al. | 166/293 |
| 3,197,317 | 7/1965 | Patchen | 166/292 |
| 3,581,825 | 6/1971 | Messenger | 166/292 X |

FOREIGN PATENT DOCUMENTS 1,460,508  1/1977  United Kingdom ..................... 166/293

OTHER PUBLICATIONS

Christian et al., "Gas Leakage in Primary Cementing—A Field Study and Laboratory Investigation," Journal of Petroleum Tech., 11-1976, pp. 1361-1369.

Parker, "Specialty Cements Can Solve Special Problems," The Oil and Gas Journal, Feb. 28, 1977, pp. 128-131.

*Primary Examiner*—Stephen J. Novosad
*Attorney, Agent, or Firm*—C. A. Huggett; Henry L. Ehrlich

[57] ABSTRACT

This specification discloses a method of treating a well drilled into the earth. In carrying out this method there is formed a lightweight thixotropic cement slurry that is comprised of a low density calcined shale cement, attapulgite and water, in ratios to provide a pumpable slurry that has zero water separation. This lightweight thixotropic cement slurry having zero water separation is placed in a well and allowed to set.

6 Claims, No Drawings

TREATING WELLS TO MITIGATE FLOW-AFTER-CEMENTING

BACKGROUND OF THE INVENTION

This invention relates to the treatment of wells by positioning cement slurries therein. More particularly this invention relates to the use of a lightweight thixotropic cement slurry having zero water separation to cement wells adjacent to or above gas-bearing formations to avoid problems resulting from gas channeling through the cement slurry.

Oil well cementing practices have been used in completing wells drilled into the earth since at least the early-1900's and oil well cements have been standardized by the American Petroleum Institute (API). In this standardization, the term "oil well cement" refers to Portland cement.

Common oil well cementing practices include placing cement plugs in a wellbore to kill the well or block the flow of fluids up the wellbore; squeeze-cementing to force cement behind casing and into earth formations for such remedial purposes as sealing troublesome fluid passageways, filling voids and vugs in the formation, and combatting lost circulation problems; and cementing pipe or casing in a well.

In the completion of a well drilled into the earth, pipe or casing is normally lowered into the well and a cement slurry is pumped down the casing and up the annular space formed between the casing and the wall of the well. The cement slurry is then maintained in the annular space to allow it to set and bond the pipe to the well wall and thereby hold the pipe in place and prevent fluids from flowing behind the pipe. Various additives and formulations have been used to provide slurries having particularly desirable properties. For example, clays selected from the group of bentonite and attapulgite have been added to cement slurries as have sodium chloride, calcium chloride, dispersing agents, and gypsum.

Problems have occurred in gas cutting or channeling through the cement slurries placed in wells. In cementing casing in a well gas may flow behind the casing and through the cement slurry placed there to the surface of the earth, or may flow into lower pressured formations which communicate with the well where such gas is usually lost. The term "flow-after-cementing" has been used to characterize this phenomenon.

In an article entitled "Gas Leakage in Primary Cementing-A Field Study and Laboratory Investigation" by W. W. Christian, J. Chatterji, and G. W. Ostroot, published in the Journal of Petroleum Technology, November 1976, pp. 1361-1369, such problems and a proposed solution thereof are discussed. It is there said that with deeper well completions across gas producing horizons, especially liner cementing completions, the problems of gas leakage have become a major concern. In such completions gas leakage poses substantial problems not only in the form of potential blowouts, but also in the loss of already scarce natural resources. It is there said that recommended practices for minimizing gas leakage may be classified in two categories. The first concerns methods to obtain better bonding of the cement to both pipe and formation surfaces, and the second concerns methods that prevent entry of gas into the cemented column. This article describes an attack on the problem by the route of using fluid-loss additives to prevent entry of gas into the cemented column. Fluid-loss additives have previously been used in cement slurries. The fluid-loss consideration in primary and squeeze-cementing practices have been based on standard API fluid-loss tests. These tests use as a filter medium a 325-mesh screen at varying differential pressure. No direct method has been proposed to define what constitutes a good or adequate level of fluid-loss control. This article discusses, beginning at page 1366, a laboratory-test development of a new high-temperature fluid-loss additive. It is there said that earlier discussions have fairly well established the importance of fluid-loss additives in preventing gas migration. It was realized however that to reduce theory to practice a fluid-loss control additive was needed that could withstand high-circulating temperature in a salt medium and give a fluid-loss of about 50 ml under API fluid-loss test conditions at 190° F. A polymer was developed with proper molecular weight and molecular configuration that was found to be thermally stable in high salt concentrations. Field results using this polymer are discussed.

In British Pat. No. 1,460,508 there is described another process for cementing a well which penetrates a gas-containing geological formation to minimize gas diffusion through the cement or along the contact surface between the well casing and the wall of the well. The process comprises injecting between the well casing and the wall of the well a settable cement slurry which contains a foaming agent in such an amount as to enable the slurry to form a foam with gas of the formation, and allow the cement to set and form a substantially gas-tight cement layer between the well casing and the wall of the well.

In U.S. Pat. No. 3,197,317 to Freeman D. Patchen there is described the use of low-density cement slurries in wells, which cement slurries are formed by the addition of attapulgite to Portland cement slurries. The Portland cement slurries may contain other materials, including calcium chloride, sodium chloride, and filter-loss additives. Sea water may be used in forming the cement slurry.

In U.S. Pat. No. 3,581,825 to Joseph U. Messenger there is disclosed a method of treating wells drilled into the earth, which method is particularly applicable for cementing behind casing located in wells drilled through permafrost zones. Slurries of calcium aluminate cement, clay selected from the group of bentonite, attapulgite, and mixtures thereof, and water are formed and placed in the wells to be treated.

In an article entitled "Specialty Cements Can Solve Special Problems", by Pat N. Parker, The Oil and Gas Journal, Feb. 28, 1977, pp. 128-131, there is discussed lightweight cements that are made from Portland cement and calcined shale. These cements have no API specifications but have been widely accepted. Two such low-density cements are sold under brand names of "Trinity Lite-Wate" and "TXI Light Weight". A typical analysis of TXI Light Weight cement, which is a highly sulfate-resistant cement, is there given as follows: $SiO_2$ — 37.2%; $Al_2O_3$ — 14.8%; $Fe_2O_3$ — 5.5%; CaO — 34.1%; MgO — 0.9%; and $SO_3$ — 4.9%. A typical analysis of Trinity Lite-Wate cement, which is a highly sulfate-resistant cement with low permeability is also there given as follows: $SiO_2$ — 38.3%; $Al_2O_3$ — 13.0%; $Fe_2O_3$ — 5.2%; CaO — 35.7%; MgO — 1.6%; and $SO_3$ — 2.4%.

SUMMARY OF THE INVENTION

This invention is directed to a method of cementing a well that penetrates the earth. A low-density calcined shale cement is blended with attapulgite in an amount no greater than about 2 weight percent based on cement, and water in an amount to form a thixotropic cement slurry having essentially zero water separation. The cement slurry is injected down the well and maintained there and allowed to set.

DESCRIPTION OF THE PREFERRED EMBODIMENTS

This invention is concerned with a method of cementing a well extending into the earth. More particularly, this invention is concerned with the use of an improved cement slurry in the cementing of a well.

As earlier discussed, flow-after-cementing often occurs in the completing of wells drilled into gas-producing formations as a result of gas channeling through the cement slurry placed in the well. The problem of flow-after-cementing occurs in a cased well when the annulus flows gas after a cement slurry has been placed around the casing. At least two explanations have been postulated for the cause of this problem. One is that the cement slurry dehydrates against a porous zone and forms a bridge of dehydrated cement in the annulus which then supports the slurry and prevents the full hydrostatic pressure of the slurry from being imposed on a lower active zone. This allows the active zone below the bridge to kick, that is, to flow gas into the annulus, which gas then flows upward through the cement slurry to the surface of the earth or into lower pressured formations. Efforts have been made to combat the problem of flow-after-cementing by using a cement slurry having low filter-loss but these efforts have not always proven to be successful.

A second explanation for the cause of flow-after-cementing is that the cement slurry placed in the well separates into water and into discrete particles, which particles then form a cement lattice and prevent the full hydrostatic pressure of the cement slurry from being applied in the well. On the basis of this explanation I discovered an improved method of cementing a well and avoiding the problem of flow-after-cementing which method involves the use of a thixotropic cement slurry having essentially zero water separation. Laboratory work was carried out to formulate a lightweight thixotropic cement slurry having essentially zero water separation and thereafter field work was carried out to test the use of such a cement slurry formulation in an area where flow-after-cementing was a current problem and where the use of cement slurries with filter-loss additives had been unsuccessful in combatting flow-after-cementing. This field work demonstrated that the problem of flow-after-cementing could successfully be combatted by using a properly formulated thixotropic cement slurry having essentially zero water separation.

Standard tests of cement slurries for water separation and for filter loss are provided in the API recommended practice for testing oil well cements and cement additives issued by the American Petroleum Institute, which issue is further identified as API RP 10B, 19th Edition, January 1974. The test for water separation is found in Section 4, entitled "Determination of Water Content of Slurry". Generally, this test involves preparing a cement slurry in accordance to Section 3, immediately pouring this slurry into an atmospheric consistometer and stirring at 80° F. for a period of 20 minutes, and then remixing the slurry for an additional 35 seconds at high speeds in a small Waring blender. This slurry is then used to fill a 250-ml. graduated glass cylinder which is sealed to prevent evaporation. This cylinder is then allowed to stand quiescent for 2 hours and any supernatant water that is developed is removed and measured. This supernatant water is expressed in milliliters and is designated the free water content.

The tests for the filter-loss of a cement slurry are provided in the same API recommended practice in Section 8, entitled "Fluid-Loss Test". In accordance with this test, a cement slurry prepared in accordance with Section 3 is placed in a filter press and the temperature of the slurry is determined. Pressure is applied to the slurry and filtrates are recovered from the filter press and filtrate readings are taken at ¼, ½, 1, 2, and 5 minutes, and thereafter at 5-minute intervals until 30 minutes have elapsed. After the 30-minute test the volume of filtrate recovered is reported as fluid-loss at 100 psi. A further test is provided for pressures at 1000 psi.

The tests for water content and fluid-loss of cement slurries are completely different one from the other and the water content and fluid-loss properties of cement slurries may be independent one from the other. Thus, for example, a cement slurry formulated to have low fluid-loss may yield a high free water content.

In accordance with this invention a low-density calcined shale cement is blended with attapulgite in an amount no greater than about 2 weight percent based on cement and water in an amount to form a thixotropic cement slurry having a density within the range of 11.5 lb/gal to 13.5 lb/gal and having essentially zero water separation. The slurry is injected down the well and maintained there and allowed to set. Sodium chloride and calcium chloride may be included in the slurry as an accelerator. The amount of sodium chloride and calcium chloride is selected to obtain a desired thickening time for the slurry. Normally, sodium chloride is included in an amount to provide a concentration no greater than about 10 weight percent based on fresh mixing water and calcium chloride in an amount no more than about 3 weight percent based on cement. The water used for forming the cement slurry may be fresh water or brine such as sea water.

This invention is particularly applicable for cementing pipe in a well that penetrates an active gas zone to prevent flow-after-cementing. In cementing pipe in a well in accordance with this invention, a low-density calcined shale cement is blended with attapulgite and water as previously described and is injected down the well and into the annulus formed about the pipe and maintained there and allowed to set. This invention is particularly applicable for use in cementing offshore wells inasmuch as sea water may be used and, in fact, is preferred for forming the cement slurry. Sea water is readily available at such locations and when used as mixing water for forming a slurry with calcined shale cement and attapulgite produces a slurry having essentially zero water separation. I have found that a particularly effective cement slurry for mitigating the problem of flow-after-cementing is formed by blending a calcined shale cement such as that calcined shale cement sold under the trade name of "Trinity Lite-Wate" cement with about 0.5 weight percent attapulgite based on cement and 8.9 gallons of sea water per 75 lb. sack of cement. This blend gives a 12.5-lb/gal slurry having a yield of 1.62 cubic feet per 75 lb. sack of cement. This slurry may be accelerated as previously described by including therein calcium chloride in an amount no greater than about 3 weight percent based on cement. Sodium chloride may also be used as an accelerator, in which case the sodium chloride should be used in an amount no greater than about 7 weight percent based on sea water in order for the sodium chloride content of the slurry to be no greater than about 10 weight percent based on fresh water.

Laboratory tests were carried out using slurries prepared with Trinity Lite-Wate cement as the calcined shale cement and the data resulting from these tests are given in Tables 1–5. Table 1 gives the slurry properties of Trinity Lite-Wate cement mixed with sea water. Attapulgite was ignored in calculating the slurry properties. Table 2 gives the strength and thickening time data. Table 3 gives the consistency and free water data, and Table 4 gives the gel strength data as determined on a Fann Viscometer. Table 5 gives data obtained in twenty tests of lightweight cements. As mentioned earlier, it is desirable for the cement slurry used to combat flow-after-cementing problems to have a zero water separation but a water separation up to about 0.5 milliliter can be tolerated. It is seen from tests of Samples 1, 2, and 3 that zero water separation was obtained when mixing slurries with sea water and from tests of Samples 3, 4, and 5 that an unacceptably large water separation was obtained when mixing similar slurries with fresh water. Based upon this data sea water is shown to be the preferred mixing water. Further, in offshore locations sea water is the most plentiful and easily obtainable mixing water and therefore is preferred in such locations for these reasons also. However, these tests are not considered to be conclusive for showing that satisfactory slurries could not be obtained using fresh mixing water. Some differences in the data obtained are unexplained and may be contributed to errors in the testing. For example, in tests of Sample 1, a slurry formed of Trinity Lite-Wate cement, 0.5 weight percent attapulgite based on cement, 2.0 weight percent calcium chloride based on cement, and sea water in an amount to form a 12.5-lb/gal thixotropic slurry yielded a zero water separation, whereas test of Sample 11 a similar slurry yielded a 2.0-milliliter water separation.

Table 1

| | SLURRY PROPERTIES | | | | | | |
|---|---|---|---|---|---|---|---|
| | Sea Water Expressed as | | | Salt (NaCl) | | Slurry | Yield |
| Cement | % by wt of cem | Fresh Water % on cem | gal per sack | % by wt of water | % by wt of cem | Density ppg | cu ft per sk of cem |
| Tr LW | 102.0 | 99.0 | 8.90 | | | 12.5 | 1.62 |
| Tr LW | 74.2 | 72.0 | 6.47 | | | 13.5 | 1.29 |
| Tr LW | 109.2 | 106.0 | 9.53 | 6.0 | 6.4 | 12.5 | 1.73 |
| Tr LW | 77.2 | 75.0 | 6.74 | 6.0 | 4.5 | 13.5 | 1.35 |

Attapulgite was ignored in calculating slurry properties.

Table 2

| | STRENGTH AND THICKENING TIME | | | | | |
|---|---|---|---|---|---|---|
| | Density | Additives % by wt of cem | | Compressive Strength, psi 90° F. | | Thickening Time hr:min to 100 Uc |
| Cement | ppg | Attap. | NaCl | 8 hour | 24 hour | 104° F. |
| Tr LW | 12.5 | .25 | | 63 | 388 | 10:34 |
| Tr LW | 12.5 | .5 | | 34 | 166 | 10:16 |
| Tr LW | 13.5 | .5 | | 103 | 441 | 4:43 |
| Tr LW | 12.5 | .5 | 6.4 | 56 | 190 | 8:14 |
| Tr LW | 13.5 | .5 | 4.5 | 145 | 473 | 5:37 |

Table 3

| | | CONSISTENCY AND FREE WATER | | | | | |
|---|---|---|---|---|---|---|---|
| | Density | Additives % by wt of cem | | Consistency, Uc | | | Free Water |
| Cement | ppg | Attap. | NaCl | 0 min | 5 min | 20 min | Vol % |
| Tr LW | 12.5 | | | 2 | 6 | 6 | 0.9 |
| Tr LW | 12.5 | .25 | | 3 | 7 | 7 | 0.5 |
| Tr LW | 12.5 | .5 | | 12 | 18 | 20 | 0.0 |
| Tr LW | 12.5 | .5 | 6.4 | 2 | 3 | 4 | 0.4 |
| Tr LW | 13.5 | .5 | 4.5 | 7 | 8 | 8 | 0.0 |

Table 4

| | GEL STRENGTH (Determined on a Fann Viscometer) | | | | | |
|---|---|---|---|---|---|---|
| | Density | Additives % by wt of cem | | Gel Strength lb/100 sq ft | | |
| Cement | ppg | Attap. | NaCl | 10 sec | 10 min | 2 hour |
| Tr LW | 12.5 | | | 11 | 12 | 300+ |
| Tr LW | 12.5 | .25 | | 14 | 17 | 300+ |
| Tr LW | 12.5 | .5 | | 10 | 12 | 300+ |
| Tr LW | 13.5 | .5 | | 21 | 30 | |
| Tr LW | 12.5 | .5 | 6.4 | 11 | 13 | |
| Tr LW | 13.5 | .5 | 4.5 | 19 | 23 | |

Table 5

| COMPOSITION AND PROPERTIES OF CEMENT SLURRIES FOR MITIGATING FLOW-AFTER-CEMENTING | | | | | | | | | | |
|---|---|---|---|---|---|---|---|---|---|---|
| Sample No. | 1 | 2 | 3 | 4 | 5 | 6 | 7 | 8 | 9 | 10 |
| Composition: | | | | | | | | | | |
| Trinity Lite Wate | X | X | X | X | X | X | Neat | Dowell Light Weight Neat | X | X |
| Attapulgite, % | 0.5 | 1.0 | 1.5 | 0.5 | 1.0 | 1.5 | | | 0.5 | 0.5 |
| Calcium Chloride, % | 2.0 | 2.0 | 2.0 | 2.0 | 2.0 | 2.0 | | | 1.0 | 1.0 |
| Salt, % on mixing water | | | | | | | | | | |
| Sea water, % | X | X | X | | | | X | X | X | X |
| Fresh water, % | | | | X | X | X | | | | |
| Properties: | | | | | | | | | | |
| Weight, lb/gal | 12.5 | 12.5 | 12.5 | 12.5 | 12.5 | 12.5 | 12.5 | 12.5 | 12.5 | 12.5 |

Table 5-continued
COMPOSITION AND PROPERTIES OF CEMENT SLURRIES FOR MITIGATING FLOW-AFTER-CEMENTING

| | | | | | | | | | | |
|---|---|---|---|---|---|---|---|---|---|---|
| Water separation, ml | 0 | 0 | 0 | 4.8 | 3.8 | 4.2 | 0.4 | 6.5 | | 0 |
| Thickening Time, Hr:min on 104° BHCT | | | | | | | | | | 3:30+ |
| Initial Gel, lb/100 sq ft | | | | | | | | | | |
| 10 Min-Gel, lb/100 sq ft | | | | | | | | | | |
| API Filter Loss, cc in 30 Min at 1000 psi | | | | | | | | | | |
| Compressive Strength, psi | | | | | | | | | | |
| in 8 hr at 90° F. | | | | | | | | 73 | | |
| 16 hr at 90° F. | | | | | | | | 177 | | |
| 24 hr at 90° F. | | | | | | | | | | 306 |
| 8 hr at 100° F. | 75 | 75 | 75 | | | | | | | |
| 12 hr at 100° F. | 125 | 115 | 130 | | | | | | | |
| 16 hr at 100° F. | 185 | 185 | 180 | | | | | | | |
| 24 hr at 100° F | 345 | 335 | 345 | | | | | | | 438 |
| 8 hr at 135° F. | | | | | | | | | | |
| 12 hr at 135° F. | | | | | | | | | | |
| 16 hr at 135° F. | | | | | | | | | | |
| 24 hr at 135° F. | | | | | | | | | | |

| Sample No. | 11 | 12 | 13 | 14 | 15 | 16 | 17 | 18 | 19 | 20 |
|---|---|---|---|---|---|---|---|---|---|---|
| Composition | | | | | | | | | | |
| Trinity Lite Wate | X | X | X | X | X | X | X | X | X | X |
| Attapulgite, % | 0.5 | 1.0 | 1.0 | 0.5 | 0.5 | 0.5 | 0.5 | 0.5 | 0.5 | 1.0 |
| Calcium Chloride, % | 2.0 | 1.0 | 2.0 | 1.0 | 1.0 | 1.0 | None | None | None | 1.0 |
| Salt, % on mixing water | | | | | | | | | | |
| Sea water, % | X | X | X | 97.5 | X | X | X | 95 | 105 | 95 |
| Fresh water, % | | | | | | | | | | |
| Properties: | | | | | | | | | | |
| Weight, lb/gal | 12.5 | 12.0 | 12.0 | 12.5 | 13.5 | 12.5 | 12.5 | 12.0 | 12.55 | |
| Water separation, ml | 2.0 | 2.0 | 2.0 | 0.2 | | | 0.25 | 0 | 1.25 | 0 |
| Thickening Time, Hr:min on 104° BHCT | | | | 6:34 | 6:18 | 2:10 | 6:30 | 7:45 | 8:00 | 5:15 |
| Initial Gel, lb/100 sq ft | | | | 14 | | | | | | |
| 10 Min-Gel, lb/100 sq ft | | | | 16 | | | | | | |
| API Filter Loss, cc in 30 Min at 1000 psi | | | | | | | | 527 | | |
| Compressive Strength, psi | | | | | | | | | | |
| in 8 hr at 90° F. | | | | 50 | | | | | | |
| 16 hr at 90° F. | | | | | | | | | | |
| 24 hr at 90° F. | 282 | 175 | 156 | 103 | | | | (105° F) | (105° F) | (105° F) |
| 8 hr at 100° F. | | | | 166 | | | | 140 | 9.5 | 140 |
| 12 hr at 100° F. | | | | | | | | 220 | 110 | 220 |
| 16 hr at 100° F. | | | | | | | | | | |
| 24 hr at 100° F. | 406 | 2.54 | 200 | | | | | 530 | 345 | 530 |
| 8 hr at 135° F. | | | | | | | | | | |
| 12 hr at 135° F. | | | | 968 | 968 | 936 | | | | |
| 16 hr at 135° F. | | | | | 1935 | 1874 | | | | |
| 24 hr at 135° F. | | | | 2150 | | | | | | |

Field tests were carried out of this invention in the drilling of an offshore well in an area where flow-after-cementing problems had occurred and where the use of cement slurries with filter loss additives had been unsuccessful in controlling these problems. In this test, a thixotropic cement slurry formed of Trinity Lite-Wate cement and 0.5 weight percent attapulgite based on cement mixed with sea water to form a 12.5-lb/gal slurry having zero water separation and a minimum safe thickening time of 7 hours and 18 minutes, and a compressive strength of 30–100 psi in 24 hours at 90° F. was successfully run in cementing 13-3/8-inch casing. To make this test definitive, the annulus about the 13-3/8-inch casing was not shut in after the cement was placed therein. No flow-after-cementing occurred. Thereafter, other tests of this invention were run in the same area with the same positive results. This invention is now being used as a routine practice for cementing wells to combat flow-after-cementing problems.

I claim:

1. A method of cementing a well that penetrates the earth, comprising the steps of:
    blending a low-density calcined shale cement with attapulgite in an amount no greater than about 2 weight percent based on cement and water in an amount to form a thixotropic cement slurry having a density within the range of 11.5 lb/gal to 13.5 lb/gal and having essentially zero water separation; injecting said slurry down said well; and maintaining said slurry in said well to allow said slurry to set.

2. The method of claim 1 wherein said water is sea water.

3. The method of claim 1 further comprising including in said cement slurry an accelerator selected from the salts consisting of sodium chloride in an amount no greater than about 10 weight percent based on water and calcium chloride in an amount no greater than about 3 weight percent based on cement.

4. A method of cementing pipe in a well penetrating an active gas zone to prevent flow-after-cementing, comprising:
    blending a low-density calcined shale cement with attapulgite in an amount no greater than about 2 weight percent based on cement and sea water in an amount to form a thixotropic cement slurry having a density within the range of 12.5 lb/gal to 13.5 lb/gal and having essentially zero water separation;

injecting said slurry down said well and into the annulus formed about said pipe; and maintaining said slurry in said annulus to allow said slurry to set.

5. The method of claim 4 wherein said low-density calcined shale cement is blended with 0.5 weight percent attapulgite based on cement and about 8.9 gallons of sea water per 75 pounds of cement.

6. The method of claim 5 further comprising including in said cement slurry an accelerator selected from the salts consisting of sodium chloride in an amount no greater than about 7 weight percent based on sea water and calcium chloride in an amount no greater than about 3 weight percent based on cement.

* * * * *